United States Patent
Kahle et al.

(10) Patent No.: US 8,313,248 B2
(45) Date of Patent: Nov. 20, 2012

(54) DEVICE FOR AN OPTICAL-FIBER CONNECTION

(75) Inventors: Eberhard Kahle, Hoppegarten (DE); Anne Kramer, Berlin (DE); Jörg Adomeit, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 13/367,778

(22) Filed: Feb. 7, 2012

(65) Prior Publication Data

US 2012/0201497 A1 Aug. 9, 2012

Related U.S. Application Data

(63) Continuation of application No. 12/983,699, filed on Jan. 3, 2011, now Pat. No. 8,123,415, which is a continuation of application No. 12/062,704, filed on Apr. 4, 2008, now Pat. No. 7,862,243, which is a continuation of application No. 10/513,207, filed as application No. PCT/EP03/04292 on Apr. 25, 2003, now Pat. No. 7,377,697.

(30) Foreign Application Priority Data

May 3, 2002 (DE) .................................. 102 19 935

(51) Int. Cl.
*G02B 6/38* (2006.01)

(52) U.S. Cl. ................ 385/58; 385/56; 385/66; 385/77; 385/53

(58) Field of Classification Search ................... 385/53, 385/56, 58, 69, 66, 60, 77, 78, 88, 92, 139, 385/59, 76, 70
See application file for complete search history.

(56) References Cited

U.S. PATENT DOCUMENTS

| | | |
|---|---|---|
| 5,067,783 A | 11/1991 | Lampert |
| 5,317,663 A | 5/1994 | Beard et al. |
| 5,542,015 A | 7/1996 | Hultermans |
| 5,737,464 A | 4/1998 | Underwood et al. |
| 5,838,855 A | 11/1998 | Stephenson |
| 5,887,095 A | 3/1999 | Nagase et al. |
| 6,367,984 B1 | 4/2002 | Stephenson et al. |
| 6,508,593 B1 | 1/2003 | Farnsworth et al. |
| 7,377,697 B2 | 5/2008 | Kahle et al. |
| 7,862,243 B2 | 1/2011 | Kahle et al. |
| 8,123,415 B2 * | 2/2012 | Kahle et al. ................ 385/58 |
| 2003/0156797 A1 | 8/2003 | Gheradini |
| 2006/0093274 A1 | 5/2006 | Kahle et al. |
| 2010/0111484 A1 | 5/2010 | Allen |
| 2011/0229082 A1 | 9/2011 | Kahle et al. |

FOREIGN PATENT DOCUMENTS

| | | |
|---|---|---|
| EP | 0 731 369 | 9/1996 |
| JP | 2000-266963 | 9/2000 |
| JP | 2001-033658 | 2/2001 |

* cited by examiner

*Primary Examiner* — Brian Healy
(74) *Attorney, Agent, or Firm* — Merchant & Gould P.C.

(57) ABSTRACT

Device for the coaxial connection of fiber-optic cables, comprising a single-piece coupling housing (10) and a single-piece sleeve mount (20), the sleeve mount (20) being designed with at least one latching nose (21) and the coupling housing (10) being designed with at least one latching mount which complements the at least one latching nose (21), wherein the latching mount is designed with at least one latching hook (14) and at least one stop (15).

10 Claims, 2 Drawing Sheets

Figure 1:
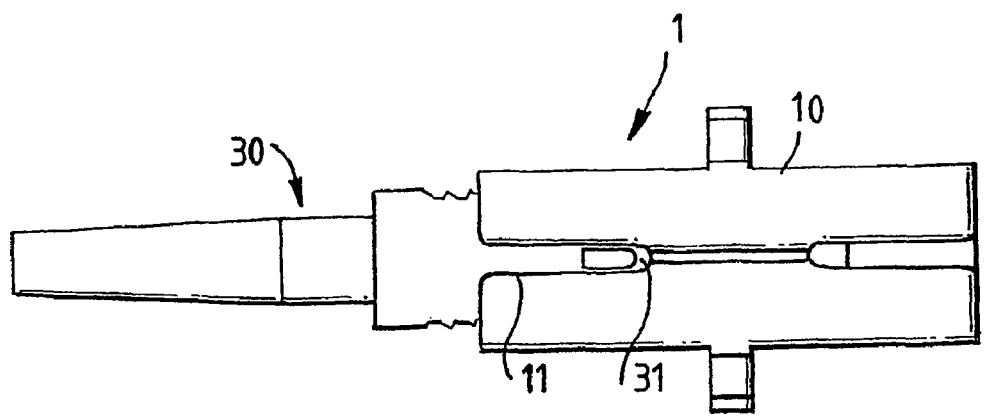

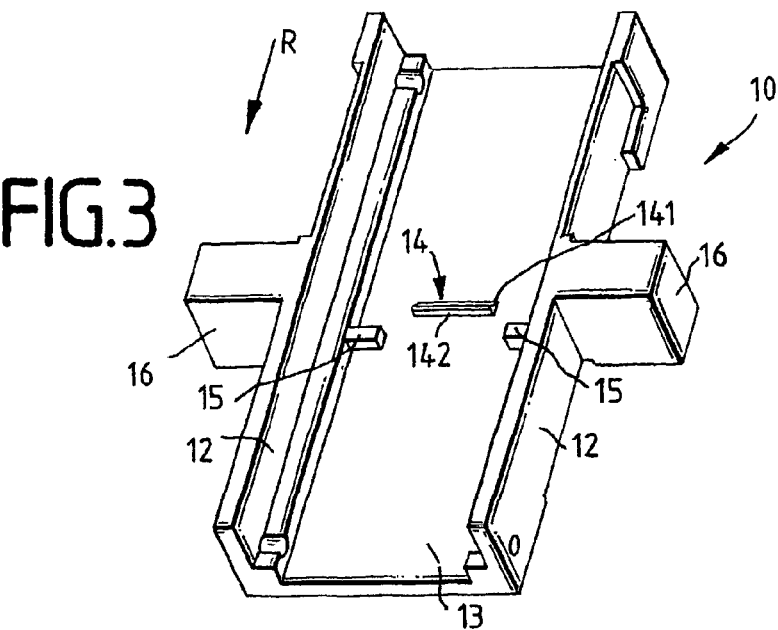
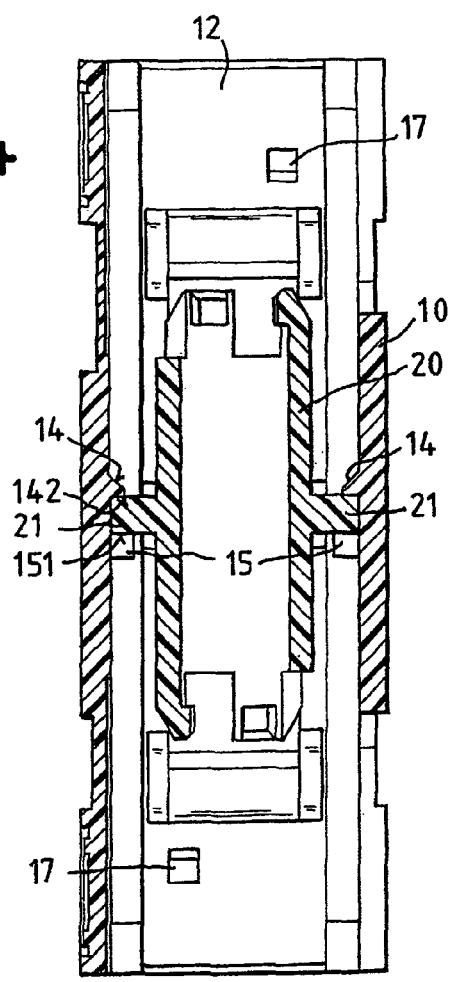

DEVICE FOR AN OPTICAL-FIBER CONNECTION

This application is a Continuation of application Ser. No. 12/983,699, filed 3 Jan. 2011, now U.S. Pat. No. 8,123,415, which is a Continuation of application Ser. No. 12/062,704, filed 4 Apr. 2008, now U.S. Pat. No. 7,862,243, which is a Continuation of application Ser. No. 10/513,207, filed 1 Sep. 2005, now U.S. Pat. No. 7,377,697, which is the National Stage of Application PCT/EP03/04292, filed 25 Apr. 2003 which claims benefit of Serial No. 102 19 935.3, filed 3 May 2001 in Germany and which applications are incorporated herein by reference. To the extent appropriate, a claim of priority is made to each of the above disclosed applications.

The invention relates to a device for a coaxial optical-fiber connection, comprising a sleeve mount and a coupling housing for accommodating the sleeve mount.

It is known for optical fibers to be connected coaxially by coupling. The optical-fiber ends which are to be connected are designed with plug-in connectors, which are accommodated by the coupling. The plug-in connectors are designed with ferrules, which are worked in a highly precise manner and are introduced into a sleeve of the corresponding coupling such that their end surfaces come into contact. The sleeve is mounted in a sleeve mount. For accommodating the plug-in connectors, the sleeve mount is designed, for example, with latching hooks at two ends. The outer shape of the coupling housing is defined by way of the given geometries of known installation openings. It is known, for easy production and installation, for the coupling housing to be configured in two parts, preferably with two identical housing halves. In order to prevent any possible gap formation between the two housing halves, the latter are, for example, welded.

U.S. Pat. No. 5,317,663 discloses a coupling housing for accommodating a two-part sleeve mount, the coupling housing comprising a basic body and a housing wall designed as a cover. Grooves are made in the basic body of the coupling housing, it being possible for complementary tongues, which are formed on the sleeve mount to be inserted into said grooves. The displacement of the connecting seam here is favorable for the stability of coupling. The configuration, however, requires at least two different molds for producing the basic body and the cover.

The Japanese patent application JP2000266963 has disclosed a single-piece coupling housing into which a single-piece sleeve mount can be inserted. The sleeve mount is designed with latching noses, which latch into complementary through-passages on the coupling housing. The through-passages on the coupling housing can be produced cost-effectively. However, the weakening of the coupling housing in the contact region of the plug-in connectors as well as the penetration of dust are disadvantageous.

The invention is based on the technical problem of providing a device which is intended for a coaxial optical-fiber connection, comprising a coupling housing and a sleeve mount, and, with a small number of parts, has a high level of stability.

The problem is solved by the subject matter having the features of claim 1. Further advantageous configurations of the invention can be gathered from the subclaims.

A single-piece sleeve mount can be latched into a single-piece coupling housing, the latching mount on the coupling housing being designed with at least one latching hook and at least one stop. A coupling with the coupling housing and the sleeve mount being designed in one piece in each case has a higher level of stability in comparison with the couplings of two-part design. The single-piece embodiment of the coupling housing prevents any possible gap formation in the contact location of two housing halves. It is possible for the coupling housing to be formed in a single mold. There is no need for any locking elements or similar additional parts for a latching fastening of the sleeve mount in the coupling housing. The use of a latching fastening, in addition, is suitable for automated installation. It is possible for the latching mount to be formed in the coupling housing without through-passages in the coupling housing.

In a preferred embodiment, the stop and latching hook of the latching mount do not have any undercut. This allows a cost-effective design of the mold and precise follow-up work on the contact surfaces without any special tools being used.

In a development, the latching hook is designed with a slope, which serves as an installation aid. The angle may be selected in accordance with the required load-bearing force of the latching mount and in order to be suitable for maximum admissible forces during the joining operation.

In a further embodiment, the latching mount of each latching nose comprises two stops and one latching hook, the latching hook being arranged between the stops. The arrangement allows the latching nose of the sleeve mount to be accommodated in a stable manner. A design comprising two latching hooks and one centrally located stop is also conceivable in order for the latching nose to be accommodated in a stable, non-tilting manner. However, for production reasons, the embodiment with two stops and one latching hook is preferred.

In a further embodiment, the latching fastening is designed with two latching mounts on mutually opposite housing walls. The embodiment with two latching mounts allows stable attachment. For installation of the sleeve mount in the coupling housing, temporary deformation of the housing is necessary in order to allow passage beyond the projecting latching-hook geometry. It is advantageous here if the housing has a relatively small accumulation of material at this location. The housing is usually designed with flanges on the outsides of two mutually opposite housing walls, for attachment to a front panel, with the result that, in the case of this embodiment, the latching mounts are preferably made on the insides of the other two housing walls.

Specific applications require a connection piece which serves, for example, as a protective device against the emission of laser light. In order to prevent any change in the outer dimensions of the coupling, which are defined by way of the given installation openings, any possible connection piece may be attached to the coupling housing by an additional inner latching fastening. The formation of the latching sockets for the sleeve mounts on two mutually opposite housing walls makes it possible for the additional latching fastening to be formed on the other two housing walls. The task of forming the latching fastening for the connection piece does not have any adverse effect on the task of forming the latching mounts for the sleeve mount.

Figure 2:
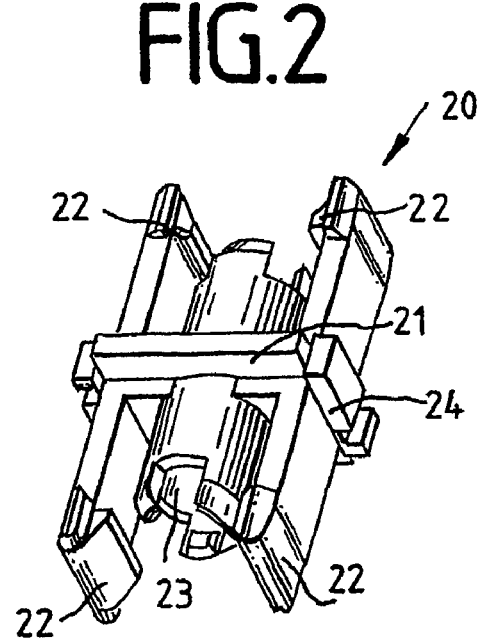

The invention is explained in more detail hereinbelow with reference to a preferred exemplary embodiment. In the figures:

FIG. 1 shows a schematic illustration of a coupling for coaxial optical-fiber connection, FIG. 2 shows a perspective view of a sleeve mount, FIG. 3 shows a perspective view of a cut-open coupling housing, and FIG. 4 a sectional illustration of the coupling housing with the sleeve mount installed.

FIG. 1 shows, schematically, a coupling 1 for the coaxial connection of fiber-optic cables. The coupling 1 comprises a coupling housing 10, in which a concealed sleeve mount 20 is mounted. The end of a fiber-optic cable is designed with a plug-on connector 30, which can be accommodated in the coupling 1 on both connection sides of the concealed sleeve mount 20. The coupling housing 10 is designed with a groove 11. For a good orientation and/or positioning of the plug-in connector 30 in the coupling 1, the plug-in connector 30 is designed with a complementary tongue 31.

FIG. 2 shows a perspective illustration of the sleeve mount 20. The sleeve mount 20 is designed with a latching nose 21, latching hooks 22, an axial bore 23 and a spacer 24. The latching nose 21 is part of a latching fastening for fixing the sleeve mount 20 in the coupling housing 10, which is illustrated in FIG. 1. The cross section of the latching nose 21 is preferably of rectangular design. This provides for a both straightforward production and a high loading capability of the associated latching fastening. The latching hooks 22 serve for accommodating the plug-in connector 30, which is illustrated in FIG. 1. In order for the plug-in connector 30 to be accommodated by the latching hooks 22, the latching hooks 22 need to move. The sleeve mount 20 is thus to be mounted in the coupling housing 10 (not illustrated in FIG. 2), such that this movement is not obstructed and a plug-in connector 30 can be accommodated by the latching hooks 22. In addition, good lateral guidance of the sleeve mount 20 in the coupling housing 10 is required. For this purpose, spacers 24 are provided on the sleeve mount 20. The contact location of two plug-in connectors 30 connected by the coupling 1 is located in a sleeve which is not illustrated but can be inserted into a bore 23 of the sleeve mount 20. The material of the sleeve may be selected here in accordance with the connection-quality requirements.

FIG. 3 shows a perspective illustration of the cut-open coupling housing 10. The coupling housing 10 is designed with flanges 16 on the outsides of two housing walls 12, it being possible for the coupling housing 10 to be attached to a front panel (not used) by means of said flanges. A rectangular through-passage for accommodating the sleeve mount 20, which is illustrated in FIG. 2, is made in the coupling housing 10. In each case one latching mount, comprising a latching hook 14 and two stops 15, is made on one housing wall 13 and on the opposite housing wall (not illustrated).

The latching nose 21 of the sleeve mount 20, said latching nose being illustrated in FIG. 2, can be fixed between the latching hook 14 and the stops 15. The sleeve mount 20 can be installed automatically in the latching direction R in the single-piece coupling housing 10. The latching hook 14 is designed with a slope 141 for the purpose of assisting the latching-in operation. Easy definition of the coupling housing 10 is necessary in the latching operation in order to allow passage beyond the latching hook 14. The housing walls 12 have an accumulation of material in this region on account of the flanges 16 which are usually present. The latching mounts are thus preferably formed on the housing walls 13. By the avoidance of any undercuts, the coupling housing 10 can be produced cost-effectively as a plastic injection molding using a single mold. The contact surfaces 151 of the stops 15, said surfaces being concealed in FIG. 3, can be worked in a precise manner by way of access in the latching direction R. A contact surface 142 of the latching hook 14 can be worked by way of access counter to the latching direction R. There is thus no need for any special tool for follow-up work on the contact surfaces 142, 151.

FIG. 4 shows the coupling housing 10 with a sleeve mount 20 installed. The designations here correspond to the preceding figures. The sleeve mount 20 is fixed between the latching hook 14 and the stops 15 via the latching nose 21. The fixing of the sleeve mount 20 does not require any further locking elements. The contact surfaces 142, 151 of the latching mount may be produced in a precise manner, with the result that play is avoidable.

The outer shape of the coupling 1 is determined by way of the given geometry of an installation opening, and it is only the length of the coupling 1 which can be varied within limits. For example, it is possible for the coupling housing 10 to be extended by a connection piece, which provides protection against the emission of laser radiation. In addition, it is also conceivable for dust-protection devices to be positioned on the coupling housing 10 when the plug-in connector 30 is subjected to pulling. For accommodating a connection piece, the housing walls 12 are designed with additional latching noses 17 at terminations of the coupling housing 10. The task of forming the latching noses 17 does not adversely effect the task of forming the latching mount for the sleeve mount. In order to avoid undercuts, the latching noses 17 are arranged in a diagonally offset manner.

| List of designations | |
|---|---|
| 1 | coupling |
| 10 | coupling housing |
| 11 | groove |
| 12 | housing wall |
| 13 | housing wall |
| 14 | latching hook |
| 141 | slope |
| 142 | contact surface |
| 15 | stop |
| 151 | contact surface |
| 16 | flange |
| 17 | latching nose |
| 20 | sleeve mount |
| 21 | latching nose |
| 22 | latching hook |
| 23 | bore |
| 24 | spacer |
| 30 | plug |
| 31 | tongue |

The invention claimed is:

1. An optical connection device comprising:
a coupling housing extending along a longitudinal axis from a first end to a second end, the coupling housing defining an interior, a first port providing access to the interior through the first end, and a second port providing access to the interior through the second end, and the coupling housing having at least one stop and at least a first part of a latching mechanism disposed within the interior between the first and second ends; and
a sleeve mount extending from a first end to a second end and having opposite first and second sides, the sleeve mount defining a first port facing towards the first end and a second port facing towards the second end, the ports being disposed between the first and second sides of the sleeve mount, the sleeve mount including first latching fingers extending towards the first end at the opposite first and second sides and second latching fingers extending towards the second end at the opposite first and second sides, and the sleeve mount including a second part of a latching mechanism extending from the first side to the second side transverse to the first and second latching fingers.

2. The optical connection device of claim 1, wherein the coupling housing includes at least a second stop aligned laterally with the one stop.

3. The optical connection device of claim 2, wherein the coupling housing includes at least a first part of a second latching mechanism disposed within the interior opposite the first part of the latching mechanism.

4. The optical connection device of claim 3, wherein the coupling housing includes at least a third stop disposed adjacent the first part of the second latching mechanism and laterally aligned with the at least one stop.

5. The optical connection device of claim 3, wherein the sleeve mount includes a second part of the second latching mechanism, the second part of the second latching mechanism extending from the first side to the second side of the sleeve mount transverse to the first and second latching fingers.

6. The optical connection device of claim 5, wherein the second part of the second latching mechanism extends away from the sleeve mount in an opposite direction from the second part of the latching mechanism.

7. The optical connection device of claim 1, wherein the first and second latching fingers at the first side of the sleeve mount extend along a common plane and wherein the first and second latching fingers at the second side of the sleeve mount extend along another common plane.

8. A method of assembling an optical connection device including a coupling housing and a sleeve mount, the sleeve mount having first latching members extending in a first direction around a first port and part of a latching mechanism extending between the first latching fingers transverse to the first direction, the method comprising:
    sliding a sleeve mount in a first direction through a first end of a coupling housing into an interior of the coupling housing;
    continuing to slide the sleeve mount in the first direction until the part of the latching mechanism of the sleeve mount abuts at least a first stop disposed within the coupling housing to inhibit further movement in the first direction; and
    latching the sleeve mount against movement in a second direction that is opposite the first direction through a snap-engagement between the sleeve mount and the coupling housing.

9. The method of claim 8, wherein latching the sleeve mount comprises sliding the part of the latching mechanism over a ramp disposed within the interior of the coupling housing until the part of the latching mechanism snaps over a shoulder of the ramp.

10. The method of claim 8, wherein continuing to slide the sleeve mount in the first direction until the part of the latching mechanism of the sleeve mount abuts the first stop comprises continuing to slide the sleeve mount in the first direction until the part of the latching mechanism of the sleeve mount also abuts a second stop that is spaced from the first stop.

* * * * *